(12) United States Patent
Wensink et al.

(10) Patent No.: US 6,978,630 B2
(45) Date of Patent: Dec. 27, 2005

(54) DUAL-CIRCUIT REFRIGERATION SYSTEM

(75) Inventors: Theodore C. Wensink, LaGrange, IN (US); David T. Radle, LaGrange, IN (US)

(73) Assignee: Dometic Corporation, Elkhart, IN (US)

( * ) Notice: Subject to any disclaimer, the term of this patent is extended or adjusted under 35 U.S.C. 154(b) by 0 days.

(21) Appl. No.: 10/758,886

(22) Filed: Jan. 16, 2004

(65) Prior Publication Data

US 2005/0155375 A1 Jul. 21, 2005

(51) Int. Cl.[7] .............. F25B 7/00; F25B 41/04; F25B 41/06; B60H 1/32
(52) U.S. Cl. .............. 62/175; 62/222; 62/244; 62/511
(58) Field of Search .............. 62/175, 510, 222, 62/228.5, 244, 511

(56) References Cited

U.S. PATENT DOCUMENTS

| | | | |
|---|---|---|---|
| 3,984,224 A | | 10/1976 | Dawkins |
| 4,105,064 A | * | 8/1978 | Del Toro et al. ............ 165/233 |
| 4,201,065 A | * | 5/1980 | Griffin ........................ 62/510 |
| 4,332,137 A | | 6/1982 | Hayes, Jr. |
| 4,372,129 A | | 2/1983 | Bennett et al. |
| 4,470,270 A | | 9/1984 | Takada et al. |
| 4,474,026 A | | 10/1984 | Mochizuki et al. |
| 4,506,516 A | * | 3/1985 | Lord ............... 62/117 |
| 4,676,072 A | | 6/1987 | Higuchi |
| 4,771,823 A | | 9/1988 | Chan |
| 4,873,837 A | | 10/1989 | Murray |
| 5,205,130 A | | 4/1993 | Pannell |
| 5,231,849 A | | 8/1993 | Rosenblatt |
| 5,307,645 A | | 5/1994 | Pannell |
| 5,875,637 A | * | 3/1999 | Paetow .................... 62/117 |
| 5,943,871 A | | 8/1999 | Ito et al. |
| 6,035,655 A | | 3/2000 | Hare et al. |
| 6,167,621 B1 | | 1/2001 | Goth et al. |
| 6,415,620 B1 | | 7/2002 | Ferdows |
| 6,553,778 B2 | * | 4/2003 | Tipton et al. .............. 62/196.1 |

* cited by examiner

Primary Examiner—Marc Norman
(74) Attorney, Agent, or Firm—Pearne & Gordon LLP

(57) ABSTRACT

A refrigeration system and method of refrigeration employ dual refrigeration circuits. Each circuit has an independent compressor, condenser and evaporator. In one refrigeration circuit, the flow of the refrigerant from the condenser to the evaporator is regulated in response to variations in the heat load at the evaporator while, in the other refrigeration circuit, the refrigerant is passed from the condenser to the evaporator at a substantially constant rate of flow. The refrigeration system can be used as a cooling system, including an air conditioning system, and as a heat pump. The evaporator in both circuits may be incorporated within a common heat exchanger as may the two condensers. Additionally, the flow of the refrigerant from the condenser to the evaporator in one refrigeration circuit may be regulated in response to variations in the heat load in the evaporator in that refrigeration circuit by a thermal expansion valve.

41 Claims, 1 Drawing Sheet

DUAL-CIRCUIT REFRIGERATION SYSTEM

BACKGROUND OF THE INVENTION

The present invention relates, generally, to a system and a method for controlling the temperature of an environment. Such systems, typically referred to as refrigeration systems, have the ability to both cool and heat an environment. The present invention comprises a refrigeration system that is particularly effective as a cooling or air conditioning system for recreational vehicles but can also serve as a heat pump.

Recreational vehicles such as mobile homes, motor homes, travel trailers, recreational vans and the like, typically, have cooling, or air conditioning systems to provide cool, dehumidified air to the interior environments of the vehicles. Conventionally, the systems are single-stage systems. That is, the systems have a single compressor, condenser and evaporator and one of each of the system auxiliary elements such as expansion valves and fans. Single-stage systems, normally, are adequate when the ambient temperature is moderate, such as in the early spring and late fall. However, when the ambient temperature is high, the single-stage systems are not always able to provide the desired cooling effect. Consequently, to some extent, dual-stage or dual-circuit systems of various types have replaced the single-stage systems. In some cases, only one of the components of the cooling system, for example the evaporator, is duplicated. In other cases, the entire cooling system is duplicated.

BRIEF SUMMARY OF THE INVENTION

Much of the description and discussion herein relating to the refrigeration system of the present invention is presented with reference to the use of the invention as an air conditioning system for recreational vehicles. However, the invention has application, generally, as a cooling system. Additionally, the invention can be used as an air conditioning system with other than recreational vehicles. Also, the refrigeration system of the invention can be used as a heat pump.

In general, it is desirable that a refrigeration system perform its cooling or air conditioning function as rapidly as possible and that any method of cooling do the same. An example is the case of vehicles, such as recreational vehicles, the interiors of which can become quite warm when the vehicles remain in an idle condition for any length of time in a hot environment. In those circumstances a large heat load must be removed in order to bring the interiors of the vehicles to a comfortable temperature and humidity. It is also desirable that the costs of such systems and methods of cooling be reasonable. The present invention accomplishes both of the these objectives. Additionally, it is preferable if the air conditioning system is capable of being used as a heat pump and the system of the present invention has that capability.

In its most comprehensive aspect, the refrigeration system of the present invention employs dual refrigeration circuits. Each of the circuits has an independent compressor, condenser and evaporator. In one refrigeration circuit, the flow of a refrigerant from the condenser to the evaporator is regulated in response to variations in the heat load at the evaporator in that refrigeration circuit while, in the other refrigeration circuit, the refrigerant is passed from the condenser to the evaporator at a substantially constant rate of flow. In a presently preferred embodiment of the invention, the evaporators in both circuits are incorporated within a common heat exchanger.

In accordance with a more detailed aspect, the refrigeration system of the invention comprises first and second refrigeration circuits. Each refrigeration circuit includes a refrigerant, a compressor, a condenser, and an evaporator. A first fluid conductor in each refrigeration circuit connects the compressor and condenser in the refrigeration circuit for conveying the refrigerant from the compressor to the condenser. A second fluid conductor in each refrigeration circuit connects the condenser and the evaporator in the refrigeration circuit for conveying the refrigerant from the condenser to the evaporator, and a third fluid conductor in each refrigeration circuit connects the evaporator and the compressor in the refrigeration circuit for conveying the refrigerant from the evaporator to the compressor. A flow regulator is located in the fluid conductor connecting the condenser and the evaporator in the first refrigeration circuit for establishing a pressure differential between the condenser and the evaporator in the first refrigeration circuit and regulating the flow of the refrigerant from the condenser to the evaporator in the first refrigeration circuit in response to variations in the heat load at the evaporator in the first refrigeration circuit. A flow-restricting device is located in the fluid conductor connecting the condenser and the evaporator in the second refrigeration circuit for establishing a pressure differential between the condenser and the evaporator in the second refrigeration circuit and passing the refrigerant in the second refrigeration circuit from the condenser to the evaporator in the second refrigeration circuit at a substantially constant rate of flow.

The refrigeration system, as described in the preceding paragraph, can be used as a cooling system, including an air conditioning system, or as a heat pump. The evaporators of both refrigeration circuits may be contained within a common heat exchanger. Further, the flow regulator in the first refrigeration circuit may comprise a thermal expansion valve and the flow-restricting device in the second refrigeration circuit may comprise a capillary tube. There also may be provided a controller for selectively controlling the activation and deactivation of the first and second refrigerant circuits in response to a temperature reference point, such as the temperature of air to be cooled, when the refrigeration system is used for cooling purposes, or in response to the temperature of the air to be warmed, when the refrigeration system is used as a heat pump.

In accordance with another aspect of the invention, a method of cooling an environment uses a cooling system having first and second cooling circuits. The first cooling circuit is activated when the temperature of a space to be cooled, such as the interior of a recreational vehicle, is at least as great as a preselected temperature. Upon activation of the first cooling circuit a refrigerant in the first cooling circuit is compressed in a compressor. The compressed refrigerant is then conveyed to a condenser in the first cooling circuit. A fluid having a temperature less than the temperature of the compressed refrigerant in the condenser in the first cooling circuit is passed over a heat exchanger associated with the condenser in the first cooling circuit to cool and liquify the refrigerant in the condenser in the first cooling circuit. The cooled refrigerant from the condenser in the first cooling circuit is then conveyed to an evaporator in the first cooling circuit while the pressure of the refrigerant is reduced to allow the refrigerant to expand. Air from a space to be cooled is passed over a heat exchanger associated with the evaporator in the first cooling circuit to cool the air, and the cooled air is recirculated to the space to be cooled. Thereafter, the refrigerant is returned to the compressor in the first cooling circuit and the foregoing steps are continued in the first cooling circuit until the temperature of the space to be cooled reaches the preselected temperature. The second cooling circuit is activated when the temperature of the space to be cooled is greater than the preselected temperature by a preselected incremental amount, for example, three degrees Fahrenheit. Upon the activation of the second cooling circuit, a refrigerant is compressed in a compressor in the second cooling circuit. The compressed refrigerant is then conveyed to a condenser in the second cooling circuit. A fluid having a temperature less than the temperature of the compressed refrigerant in the condenser in the second cooling circuit is passed over a heat exchanger associated with the condenser in the second cooling circuit to cool the refrigerant. The cooled refrigerant is passed from the condenser in the second cooling circuit to an evaporator in the second cooling circuit while the pressure of the refrigerant in the second cooling circuit is reduced to allow the refrigerant in the second cooling circuit to expand. Air from the space to be cooled is passed over a heat exchanger associated with the evaporator in the second cooling circuit to cool the air and the cooled air is recirculated to the space to be cooled. The refrigerant is returned from the evaporator in the second cooling circuit to the compressor in the second cooling circuit. The foregoing steps are repeated in the second cooling circuit until the temperature of the space to be cooled reaches the preselected temperature. The rate of flow of the refrigerant from the condenser to the evaporator in either of the first or second cooling circuits is regulated in response to variations in the heat load at the evaporator in the cooling circuit in which the rate of flow of refrigerant is being regulated. At the same time, the refrigerant is passed from the condenser to the evaporator in the other of the cooling circuits at a substantially constant rate of flow.

In the method set forth in the preceding paragraph, the evaporators in both the first and second cooling circuits may be incorporated within a common heat exchanger. Further, in the presently preferred embodiment of the invention, the reduction of the pressure of the refrigerant and the regulation of the rate of flow of the refrigerant from the condenser to the evaporator in one of the cooling circuits, in response to variations in the heat load at the evaporator, may be accomplished by passing the refrigerant through a thermal expansion valve; and the reduction of the pressure of the refrigerant and the conveyance of the refrigerant from the condenser to the evaporator in the other cooling circuit at, substantially a fixed rate of flow is accomplished by passing the refrigerant through a capillary tube. Additionally, it is presently preferred that the rate of flow of the refrigerant be regulated in the first cooling circuit. Controllers, such as thermostats, may be provided to activate the cooling circuits as required.

BRIEF DESCRIPTION OF THE DRAWING

Referring now to the drawing wherein like elements are numbered the same in the two Figures.

DETAILED DESCRIPTION OF THE INVENTION

The refrigeration system of the present invention may be used as a cooling system, such as an air conditioning system, and as a heat pump system. However, to facilitate an understanding of the invention, the following description of an embodiment of the invention is based on the use of the invention as an air conditioning system for a recreational vehicle. The use of the invention as a heat pump system requires only that the direction of flow of the refrigerant in the system be reversed.

Figure 1:
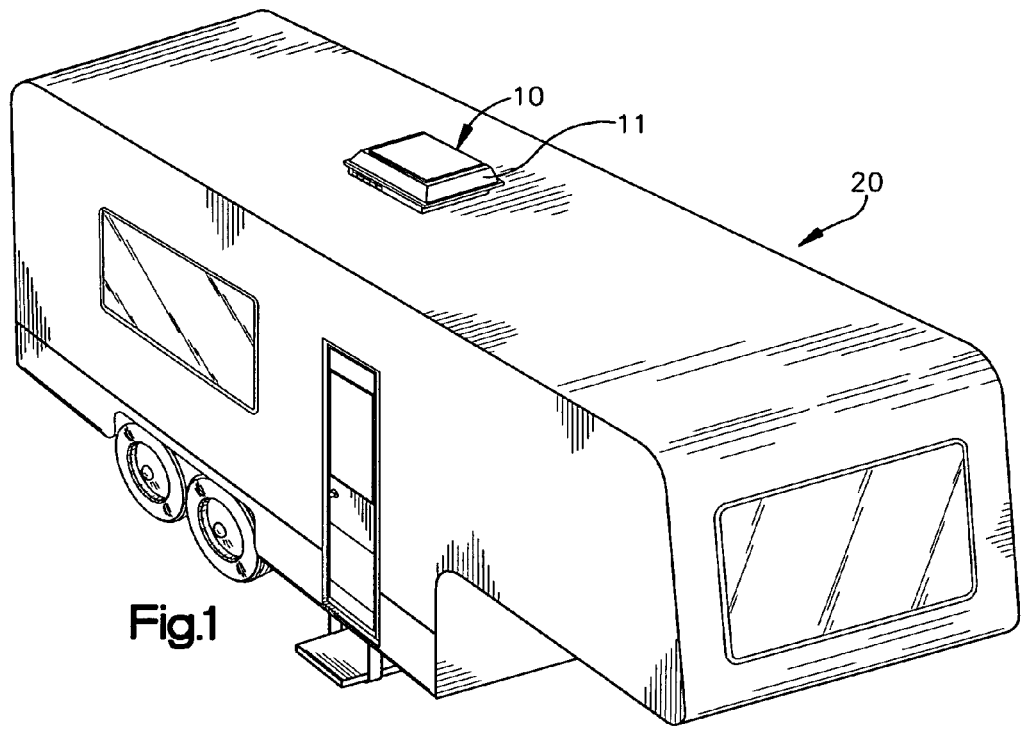
FIG. 1 is a perspective view of a recreational vehicle having the cooling system of the present invention mounted on the rooftop of the vehicle.

Referring to FIG. 1, the cooling, or air conditioning, system of the invention is shown, generally, at 10 mounted on the roof of a mobile home 20. The system may be used with other types of recreational vehicles, such as motor homes, travel trailers and the like, as well. The operating components of the air conditioning system, typically, are supported on a base pan, not shown, inside an outer cover 11. Ducts, not shown, are connected to the air conditioning system and are supported from the ceiling within the interior of the vehicle 20. The ducts are provided with openings from which cool air generated by the air conditioning system is delivered into the interior space of the vehicle. It is not necessary that the system be mounted on the roof of the recreational vehicle and it can be mounted elsewhere, such as below the floor of the vehicle. Similarily, the ducts may be located beneath the floor of the vehicle.

Figure 2:
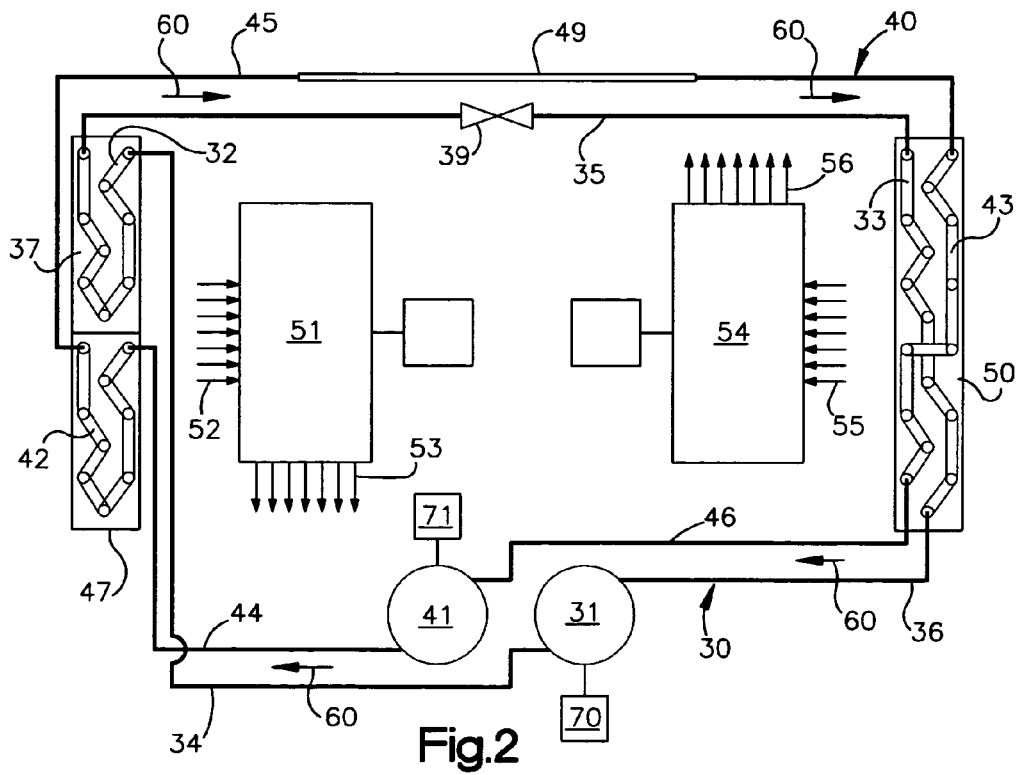
FIG. 2 is a schematic drawing of the cooling system of the present invention.

The components that make up the cooling system of the invention are schematically illustrated in FIG. 2. Basically, the system comprises two, essentially, independent cooling circuits 30 and 40. Each cooling circuit includes a compressor, a condenser, an evaporator and an expansion valve. In the cooling circuit 30, the compressor is shown at 31, the condenser at 32, the evaporator at 33 and the expansion valve at 39. The outlet of the compressor 31 and the inlet of the condenser 32 are connected by a fluid conductor 34, the outlet of the condenser 32 and the inlet of the evaporator 33 are connected by a fluid conductor 35 and the outlet of the evaporator 33 and the inlet of the compressor 31 are connected by a fluid conductor 36. The expansion valve 39 is located in fluid conductor 35 that connects condenser 32 and evaporator 33.

In the cooling circuit 40, the compressor is shown at 41, the condenser at 42, the evaporator at 43 and the expansion valve at 49. The outlet of the compressor 41 and the inlet of the condenser 42 are connected by a fluid conductor 44, the outlet of the condenser 42 and the inlet of the evaporator 43 are connected by a fluid conductor 45 and the outlet of the evaporator 43 and the inlet of the compressor 41 are connected by a fluid conductor 46. The expansion valve 49 is located in fluid conductor 45 that connects condenser 42 and evaporator 43. The fluid conductors in both the cooling circuits 30 and 40, preferably, are made of metal piping or metal conduit since, as will be understood, the cooling circuits are under a substantial pressure.

With respect to the expansion valves, expansion valve 39 is a thermal expansion valve and expansion valve 49 is a capillary tube. The precise manner in which these two expansion valves function is described below.

As shown in FIG. 2, the condensers 32 and 42 have separate heat exchangers 37 and 47, respectively, such as fin packs. The evaporators 33 and 43, on the other hand, are shown as having a common heat exchanger 50, such as a fin pack. However, it is not essential to the invention that the evaporators 33 and 43 be incorporated within a common heat exchanger or that the condensers 32 and 42 have separate heat exchangers. The evaporators 33 and 43 may be provided with separate heat exchangers and the condensers 32 and 42 may be provided with a common heat exchanger.

Fans or blowers 51 are provided for the purpose of passing ambient air through the heat exchangers 37 and 47, as indicated by the arrows 52, and dispelling that air, typically, to the surrounding environment, as indicated by the arrows 53. Additional fans or blowers 54 are provided for the purpose of passing air from the space to be cooled through the heat exchanger 50, as indicated by the arrows 55, and delivering the cooled air, as indicated by arrows 56, through duct work into the space to be cooled, such as the interior of the vehicle 20.

A separate fluid refrigerant is contained within each cooling circuit 30 and 40 and is circulated through the cooling circuit in the direction of the arrows 60 as shown in FIG. 2. FREON or any other suitable refrigerant may be used. The specifications of the compressors, condensers and evaporators used in the invention may vary and compressors, condensers and evaporators that are used, conventionally, in refrigeration systems may be employed.

The functions performed by the components in each of the cooling circuits 30 and 40 will now be described. Upon activation of the cooling circuit 30, the refrigerant in circuit 30 is compressed in compressor 31, thereby increasing the temperature and pressure of the refrigerant. The compressed refrigerant is then conveyed through fluid conductor 34 to the condenser 32. As the compressed and heated refrigerant is conveyed through the condenser 32, ambient air passing, under the influence of fans 51, through the heat exchanger 37 associated with the condenser 32, extracts heat from the refrigerant and, to the extent the refrigerant has not liquified, will liquify the refrigerant. The refrigerant, after exiting the condenser 30 is conveyed to the evaporator 33 through the fluid conductor 35. Before reaching the evaporator 33, however, the refrigerant passes through the thermal expansion valve 39. The valve 39 constricts the cross-sectional area of the fluid conductor 35, thereby establishing a pressure differential between the condenser 32 and the evaporator 33. As a result, the refrigerant will be converted from a liquid on the condenser side of the valve 39 to a cold vaporized gas on the evaporator side of the valve 39. As the cold gaseous refrigerant is conveyed through the evaporator 33, air from the interior of the vehicle 20, under the influence of the fans 54, is passed across the heat exchanger 50 associated with the evaporator 33. Heat is extracted from the air at the heat exchanger 50, and the cool air is returned to the interior of the vehicle. Upon passing through the evaporator 33, the refrigerant is liquified and the liquid refrigerant is conveyed through the fluid conductor 36 to the compressor 33. A controller or thermostat 70 is provided to activate the cooling circuit 30 whenever the temperature within the interior of the vehicle is greater than a preselected temperature and to deactivate the cooling circuit 30 whenever that preselected temperature is attained.

In addition to establishing a pressure differential in the cooling circuit 30, the thermal expansion valve 39 regulates the flow of the refrigerant from the condenser 32 to the evaporator 33 in response to variations in the heat load in the evaporator. Thus, typically, when the cooling circuit 30 is first activated, the air within the vehicle will be at its warmest. Consequently, the thermal expansion valve will open and the rate of flow of the refrigerant from the condenser 32 to the evaporator 33 will increase. As a result, the cooling effect produced in the cooling circuit 30 at the evaporator 32, and its associated heat exchanger 50, will be enhanced. Conversely, as the air within the interior of the vehicle cools and is recirculated through the heat exchanger 50, the heat load in the evaporator will decrease. In response to this reduction in the heat load, the thermal expansion valve will reduce the rate of flow of the refrigerant from the condenser 32 to the evaporator 33.

With respect to the cooling circuit 40, the functioning of the compressor 41 and the condenser 42 is, basically, the same as the functioning of the corresponding components in the cooling circuit 30. In other words, a refrigerant in the cooling circuit 40 is compressed in the compressor 41 and conveyed through the fluid conductor 44 to the condenser 42 where it is liquified. Liquification of the refrigerant occurs by the extraction of heat from the compressed refrigerant as the fans 51 cause ambient air to pass over the condenser 42 and its associated heat exchanger 47. The liquified refrigerant, as it exits the condenser 42, is conveyed through the fluid conductor 45 to the expansion valve 49. As indicated earlier, the expansion valve 49 comprises a capillary tube. The capillary tube has a fixed internal diameter that is smaller than the internal diameter of the fluid conductor 45. The capillary tube restricts the flow of the refrigerant in the fluid conductor 45, thereby establishing a pressure differential in the fluid conductor 45 between the condenser 42 and the evaporator 43. This pressure differential causes the liquified refrigerant to convert to a cold gas and that cold gas continues through the cooling circuit 40 to the evaporator 43. As air from the interior of the vehicle is recirculated over the heat exchanger 50 associated with the evaporator 43, by the operation of the fans 54, heat from the air is extracted by the cold refrigerant and the cooled air is returned to the interior of the vehicle as shown by the arrows 56. In the case of the cooling circuit 40, because the capillary tube has a fixed internal diameter, the rate of flow from the condenser 42 to the evaporator 43 is, substantially, constant. The foregoing operation of the cooling circuit 40 will continue until such time as the temperature of the interior of the vehicle 20 reaches the preselected temperature set in a thermostat 71 for controlling the activation and deactivation of the cooling circuit 40.

As noted above, according to a usual method of operation in cooling the interior of a recreational vehicle, the activation and deactivation of the cooling circuit 30, containing the thermal expansion valve 39, is controlled by a thermostat set at a preselected temperature. The cooling circuit 30 will be activated whenever the temperature of the interior of the vehicle is greater than the preselected temperature and will be deactivated whenever the temperature of the interior of the vehicle reaches the preset temperature. At the same time, the thermostat controlling the cooling circuit 40 is set to activate the cooling circuit 40 only if the temperature of the interior of the vehicle is greater than the preselected temperature by a preselected incremental amount. According to a specific operating mode that has been tested, the thermostat controlling the cooling circuit 40 is set to activate the cooling circuit 40 when the temperature of the interior of the vehicle is three degrees Fahrenheit greater than the preselected temperature.

As has been previously noted, although it has particular use as a cooling or air conditioning system, the invention can also be used as a heat pump. In that mode of operation, directional flow valves in the compressor are adjusted so that the flow of the refrigerant in each of the two circuits occurs in a direction opposite that shown by arrows 60.

Various modifications may be made in the invention, as described in detail above with reference to FIG. 2, without departing from the spirit thereof. Several of such modifications have been noted above. By way of example of another modification that may be made, the cooling circuit containing the thermal expansion valve can be the cooling circuit that is set to be activated only if the temperature of the air to be cooled exceeds a preselected temperature by more than an incremental amount. In that case, of course, the cooling circuit containing the capillary tube would be the only cooling circuit that would be activated when the temperature of the air to be cooled is greater than the preselected temperature by less than the preselected incremental amount. Also, the thermostats controlling the activation and deactivation of the two cooling circuits can be set at the same temperature if desired. These and other modifications may be made in the invention without departing from the spirit thereof.

What is claimed is:

1. A refrigeration system comprising first and second refrigeration circuits, each refrigeration circuit including a refrigerant, a compressor, a condenser and an evaporator, a fluid conductor in each refrigeration circuit connecting the compressor and condenser in the refrigeration circuit for conveying the refrigerant from the compressor to the condenser, a fluid conductor in each refrigeration circuit connecting the condenser and the evaporator in the refrigeration circuit for conveying the refrigerant from the condenser to the evaporator, and a fluid conductor in each refrigeration circuit connecting the evaporator and the compressor in the refrigeration circuit for conveying the refrigerant from the evaporator to the compressor, a flow regulator located in the fluid conductor connecting the condenser and the evaporator in the first refrigeration circuit for establishing a pressure differential between the condenser and the evaporator in the first refrigeration circuit and regulating the flow of the refrigerant from the condenser to the evaporator in the first refrigeration circuit in response to variations in the heat load at the evaporator in the first refrigeration circuit, and a flow restricting device in the fluid conductor connecting the condenser and the evaporator in the second refrigeration circuit for establishing a pressure differential between the condenser and the evaporator in the second refrigeration circuit and passing the refrigerant in the second refrigeration circuit from the condenser to the evaporator in the second refrigeration circuit at a substantially constant rate of flow.

2. The refrigeration system of claim 1 wherein the evaporators in both refrigeration circuits are incorporated within a common heat exchanger.

3. The refrigeration system of claim 2 wherein the flow regulator in the first refrigeration circuit comprises a thermal expansion valve.

4. The refrigeration system of claim 3 wherein the flow restricting device in the second refrigeration circuit comprises a capillary tube.

5. The refrigeration system of claim 2 wherein the flow restricting device in the second refrigeration circuit comprises a capillary tube.

6. The refrigeration system of claim 1 including a controller for selectively controlling the activation and deactivation of the first and second refrigeration circuits in response to a temperature reference point.

7. The refrigeration system of claim 6 wherein the evaporators of both refrigeration circuits are incorporated within a common heat exchanger.

8. The refrigeration system of claim 7 wherein the flow regulator in the first refrigeration circuit comprises a thermal expansion valve.

9. The refrigeration system of claim 8 wherein the flow restricting device in the second refrigeration circuit comprises a capillary tube.

10. The refrigeration system of claim 7 wherein the flow restricting device in the second refrigeration circuit comprises a capillary tube.

11. In a cooling system comprising first and second cooling circuits, each cooling circuit including a refrigerant, a compressor, a condenser and an evaporator, a fluid conductor in each cooling circuit connecting the compressor and condenser in the cooling circuit for conveying the refrigerant from the compressor to the condenser, a fluid conductor in each fluid circuit connecting the condenser and the evaporator in the cooling circuit for conveying the refrigerant from the condenser to the evaporator and a fluid conductor in each cooling circuit connecting the evaporator and the compressor in the cooling circuit for conveying the refrigerant from the evaporator to the compressor, the method of operating the cooling system comprising the steps of establishing a pressure differential between the condenser and evaporator in the first cooling circuit and regulating the flow of the refrigerant in the first cooling circuit from the condenser to the evaporator in the first cooling circuit in response to variations in the heat load at the evaporator in the first cooling circuit, and establishing a pressure differential between the condenser and evaporator in the second cooling circuit and passing the refrigerant in the second cooling circuit from the condenser to the evaporator in the second cooling circuit at a substantially constant rate of flow.

12. The method of claim 11 wherein the evaporators of both cooling circuits are incorporated within a common heat exchanger.

13. The method of claim 12 wherein the pressure differential is established in the first cooling circuit and the flow of the refrigerant from the condenser to the evaporator in the first cooling circuit is regulated in response to variations in the heat load at the evaporator in the first cooling circuit by passing the refrigerant through a thermal expansion valve.

14. The method of claim 13 wherein the pressure differential is established in the second cooling circuit and the refrigerant is passed from the condenser to the evaporator in the second cooling circuit at substantially a fixed rate of flow by passing the refrigerant through a capillary tube.

15. The method of claim 11 wherein the pressure differential is established in the second cooling circuit and the refrigerant is passed from the condenser to the evaporator in the second cooling circuit at substantially a fixed rate of flow by passing the refrigerant through a capillary tube.

16. A method of cooling using a cooling system having first and second cooling circuits, comprising the steps of activating the first cooling circuit when the temperature of a space to be cooled is at least as great as a preselected temperature, compressing a refrigerant in a compressor in the first cooling circuit, conveying the compressed refrigerant to a condenser in the first cooling circuit, passing a fluid having a temperature less than the temperature of the compressed refrigerant in the condenser in the first cooling circuit over a heat exchanger associated with the condenser in the first cooling circuit to cool and liquify the refrigerant in the condenser in the first cooling circuit, conveying the cooled refrigerant from the condenser in the first cooling circuit to an evaporator in the first cooling circuit while lowering the pressure of the refrigerant to allow the refrigerant in the first cooling circuit to expand, passing air from the space to be cooled over a heat exchanger associated with the evaporator in the first cooling circuit to cool the air and recirculating the cooled air to the space to be cooled, returning the refrigerant from the evaporator in the first cooling circuit to the compressor in the first cooling circuit and continuing the foregoing steps in the first cooling circuit until the temperature of the space to be cooled reaches the preselected temperature, activating the second refrigeration circuit when the temperature of the space to be cooled is greater than the preselected temperature by a preselected incremental amount, compressing a refrigerant in a compressor in the second cooling circuit, conveying the compressed refrigerant to a condenser in the second cooling circuit, passing a fluid having a temperature lower than the temperature of the compressed refrigerant in the condenser in the second cooling circuit over a heat exchanger associated with the condenser in the second cooling circuit to cool the refrigerant, conveying the cooled refrigerant from the condenser in the second cooling circuit to an evaporator in the second cooling circuit while lowering the pressure of the refrigerant in the second cooling circuit to allow the refrigerant in the second cooling circuit to expand, passing air from the space to be cooled over a heat exchanger associated with the evaporator in the second cooling circuit to cool the air and recirculating the cooled air to the space to be cooled, returning the refrigerant from the evaporator in the second cooling circuit to the compressor in the second cooling circuit and continuing the foregoing steps in the second cooling circuit until the temperature of the space to be cooled reaches the preselected temperature, regulating the rate of flow of the refrigerant from the condenser to the evaporator in either of the first or second cooling circuits in response to variations in the heat load at the evaporator in the cooling circuit in which the rate of flow of refrigerant is being regulated, and conveying the refrigerant from the condenser to the evaporator in the other of the cooling circuits at a substantially constant rate of flow.

17. The method of claim 16 wherein the evaporators of both cooling circuits are incorporated within a common heat exchanger.

18. The method of claim 17 wherein the pressure differential is established and the rate of flow of the refrigerant from the condenser to the evaporator is regulated in response to variations in the heat load at the evaporator in one of the cooling circuits by passing the refrigerant through a thermal expansion valve in that cooling circuit.

19. The method of claim 18 wherein the pressure differential is established and the rate of flow of the refrigerant from the condenser to the evaporator is substantially fixed in one of the cooling circuits by passing the refrigerant through a capillary tube in that cooling circuit.

20. The method of claim 17 wherein the pressure differential is established and the rate of flow of the refrigerant from the condenser to the evaporator is substantially fixed in one of the cooling circuits by passing the refrigerant through a capillary tube in that cooling circuit.

21. The method of claim 16 wherein the cooling circuit in which the rate of flow of the refrigerant from the condenser to the evaporator is regulated in response to variations in the heat load at the evaporator in that circuit is the first cooling circuit.

22. The method of claim 21 wherein the evaporators of both cooling circuits are incorporated within a common heat exchanger.

23. The method of claim 22 wherein the pressure differential is established and the rate of flow of the refrigerant from the condenser to the evaporator is regulated in response to variations in the heat load at the evaporator in one of the cooling circuits by passing the refrigerant through a thermal expansion valve in that cooling circuit.

24. The method of claim 23 wherein the pressure differential is established and the rate of flow of the refrigerant from the condenser to the evaporator is substantially fixed in one of the cooling circuits by passing the refrigerant through a capillary tube in that cooling circuit.

25. The method of claim 22 wherein the pressure differential is established and the rate of flow of the refrigerant from the condenser to the evaporator is substantially fixed in one of the cooling circuits by passing the refrigerant through a capillary tube in that cooling circuit.

26. The method of claim 16 wherein the cooling circuit in which the rate of flow of the refrigerant from the condenser to the evaporator is regulated in response to variations in the heat load at the evaporator is the second cooling circuit.

27. The method of claim 26 wherein the evaporators of both cooling circuits are incorporated within a common heat exchanger.

28. The method of claim 27 wherein the pressure differential is established and the rate of flow of the refrigerant from the condenser to the evaporator is regulated in response to variations in the heat load at the evaporator in one of the cooling circuits by passing the refrigerant through a thermal expansion valve in that cooling circuit.

29. The method of claim 28 wherein the pressure differential is established and the rate of flow of the refrigerant from the condenser to the evaporator is substantially fixed in one of the cooling circuits by passing the refrigerant through a capillary tube in that cooling circuit.

30. The method of claim 27 wherein the pressure differential is established and the rate of flow of the refrigerant from the condenser to the evaporator is substantially fixed in one of the cooling circuits by passing the refrigerant through a capillary tube in that cooling circuit.

31. The method of claim 16 wherein the number of degrees by which the second incremental amount is greater than the preselected temperature is at least three degrees Fahrenheit.

32. The method of claim 31 wherein the cooling circuit in which the rate of flow of the refrigerant from the condenser to the evaporator is regulated in response to variations in the heat load at the evaporator is the first cooling circuit.

33. The method of claim 32 wherein the evaporators of both cooling circuits are incorporated within a common heat exchanger.

34. The method of claim 33 wherein the pressure differential is established and the rate of flow of the refrigerant from the condenser to the evaporator is regulated in response to variations in the heat load at the evaporator in one of the cooling circuits by passing the refrigerant through a thermal expansion valve in that cooling circuit.

35. The method of claim 34 wherein the pressure differential is established and the rate of flow of the refrigerant from the condenser to the evaporator is substantially fixed in one of the cooling circuits by passing the refrigerant through a capillary tube in that cooling circuit.

36. The method of claim 33 wherein the pressure differential is established and the rate of flow of the refrigerant from the condenser to the evaporator is substantially fixed in one of the cooling circuits by passing the refrigerant through a capillary tube in that cooling circuit.

37. The method of claim 31 wherein the cooling circuit in which the rate of flow of the refrigerant from the condenser to the evaporator is regulated in response to variations in the heat load at the evaporator is the second cooling circuit.

38. The method of claim 37 wherein the evaporators of both cooling circuits are incorporated within a common heat exchanger.

39. The method of claim 38 wherein the pressure differential is established and the rate of flow of the refrigerant from the condenser to the evaporator is regulated in response to variations in the heat load at the evaporator in one of the cooling circuits by passing the refrigerant through a thermal expansion valve in that cooling circuit.

40. The method of claim 39 wherein the pressure differential is established and the rate of flow of the refrigerant from the condenser to the evaporator is substantially fixed in one of the cooling circuits by passing the refrigerant through a capillary tube in that circuit.

41. The method of claim 38 wherein the pressure differential is established and the rate of flow of the refrigerant from the condenser to the evaporator is substantially fixed in one of the cooling circuits by passing the refrigerant through a capillary tube in that cooling circuit.

* * * * *